United States Patent [19]
Palmer

[11] 3,987,300
[45] Oct. 19, 1976

[54] INTEGRATED ARRAY OF OPTICAL FIBERS AND THIN FILM OPTICAL DETECTORS, AND METHOD FOR FABRICATING THE SAME

[75] Inventor: John P. Palmer, Pomona, Calif.

[73] Assignee: General Dynamics Corporation, Pomona, Calif.

[22] Filed: June 27, 1975

[21] Appl. No.: 591,200

[52] U.S. Cl. .................................. 250/227; 250/239
[51] Int. Cl.² ...................... G02B 5/14; H01J 5/16; H01J 39/12
[58] Field of Search .......... 350/96 B; 250/227, 216, 250/211 J, 239

[56] References Cited
UNITED STATES PATENTS

| | | | |
|---|---|---|---|
| 3,622,419 | 11/1971 | Tempe et al. | 250/227 |
| 3,668,389 | 5/1972 | Kegelman | 250/227 |
| 3,723,735 | 3/1973 | Spelha | 250/227 |
| 3,757,127 | 9/1973 | Dhaka | 250/227 |
| 3,842,263 | 10/1974 | Kornrumpf et al. | 250/227 |

Primary Examiner—Alfred E. Smith
Assistant Examiner—David K. Moore

[57] ABSTRACT

An integrated array of optical fibers and thin film optical detectors is formed by constructing an array of optical detectors in registration with light-emitting portions of the optical fibers. A cadmium sulfide semiconducting film, grown upon a silicon substrate, is covered with an optically-transparent and electrically-conductive tin dioxide ground plane film. An array of optical fibers, having light-emitting ends in substantial contact with the conductive film, is mounted to a frame attached to such film. The frame and optical fibers are epoxy encapsulated above the conductive film; the substrate is then removed and photo resist applied over the newly-exposed semiconducting film surface. Light transmitted directly through the optical fibers, and through the light-emitting portions thereof in contact with the conductive film, is used to activate, from a rear side, only those portions of the photo resist layer which are in exact registration with the light-emitting ends of the optical fibers. After removal of the activated portions of photo resist, a film of platinum is deposited through the resulting photo resist windows onto exposed portions of the semiconductor film, thereby forming photovoltaic diodes. Aluminum contacts are applied over the platinum and, after removal of the remaining photo resist, conductors are bonded to the contacts and the ground plane film. The resulting integrated assembly may be packaged with other electronic components in a hermetically-sealed package. A method for fabricating an integrated array of optical fibers and thin film optical detectors is thereby provided.

23 Claims, 14 Drawing Figures

INTEGRATED ARRAY OF OPTICAL FIBERS AND THIN FILM OPTICAL DETECTORS, AND METHOD FOR FABRICATING THE SAME

BACKGROUND OF THE INVENTION

1. Field of the Invention

This invention relates to the field of optoelectronics, and interfacing of optical fibers and thin film optical detectors; more particularly, it relates to apparatus and methods for providing registration between individual optical fibers and individual optical detectors.

2. Description of the Prior Art

Optical and electronic elements are commonly combined to form composite systems which may be referred to as optoelectronic systems; typical examples are military target-seeking systems and systems for reading coded markings on railroad cars, wearing apparel tags and food packages. In many optoelectronic systems the optical image must be transferred from a receiving point or focal plane to another part of the system for conversion into electronic signals, usually because electronic circuitry near the receiving point or focal plane causes electrical interference with the optical-to-electronic conversion, or because there is insufficient space for the electronics associated with such conversion.

Development of optical fibers has greatly facilitated image transfer in optoelectronic systems. By means of bundles of individual optical fibers, each of which may be only a few mils in diameter and thus quite flexible, the visual image may be easily and efficiently conducted from the pick-up point or image plane to a remote location free of spurious electronic noise and where there is adequate space for associated electronics.

Normally at the image end, the fibers comprising a bundle are packed closely together; at the converting or light-emitting end, they may be spread out as necessary to accommodate to light sensitive optical detectors, generally a type of semiconductor which may be either photovoltaic or photoconductive. If the former, the detectors, when illuminated, act as voltage sources; if the latter, the resistance of the detectors varies with their illumination. In either case, an electric analog of the illumination is provided.

Each individual fiber in a bundle generally transmits only a small portion of the total image and only a very small amount of light is transmitted and emitted by each. Consequently, there must be substantially lossless light transmission from the fiber light emitting portion to the corresponding optical detection element. Stated otherwise, very nearly perfect registration is essential between the light emitting portion of the fiber and its associated detector. Lack of such registration causes partial or complete loss of the light emitted by the fiber, with the result that the detector output signal indicates that its decoded portion of the image was darker than it actually was. While this result may be relatively inconsequential in some applications, in others, such as military target aquisition systems, it may prove critical. Also, such registration permits smaller detector areas with corresponding reduction in capacitance and improvement in response time, important factors in many practical applications.

Obtaining perfect optical registration between a very small diameter optical fiber and a generally equally small optical detector element is extremely difficult. This difficulty is greatly multiplied when, as is usual, a bundle or array of fibers is concerned. The expense of making near perfect registration may thus be prohibitive for many systems. Further, even if good registration is initially achieved, maintaining the registration under normal use conditions, which may include shocks, vibration and thermal stress, is very difficult.

Hargens III (U.S. Pat. No. 3,310,681) discloses forming of optical detectors around longitudinally etched end portions of individual optical fibers. Electrically conducting caps are applied to ends of the detectors, and insulation is applied elsewhere. Two electrical contacts are then made to each detector of each fiber. However, such a method is impractical for use on very small diameter optical fibers because of the considerable mechanical problems involved. In contrast, Dhaka (U.S. Pat. No. 3,747,127) discloses a fixed, integrated array of optical detectors separately formed on a substrate using generally known microelectronic fabrication processes, and utilizing a "flip-chip" technique. A bundle of optical fibers is terminated and clamped in spaced relationship with the associated detector array which must have the same geometrical arrangement as the bundle of optical fibers. Even assuming uniform spacing of the fibers and elements, which is unlikely, slight misalignment between the detector array and the end of the separately mounted fiber bundle, either initially or during use, will cause misalignment between every or nearly every fiber and its corresponding detecting element.

For these and other reasons, there has heretofore, to the applicant's knowledge, been available no practical, relatively simple and inexpensive method or apparatus for providing and maintaining substantially perfect registration between the light-emitting end or portion of very small diameter optical fiber, particularly arrays of such optical fibers, and associated optical detector elements.

SUMMARY OF THE INVENTION

An integrated array of optical fibers and thin film optical detectors comprises an array of optical fibers, having light-emitting portions in substantial contact with a first surface of an optically transparent and electrically conductive, ground plane film and an array of optical detectors formed upon a second surface of the conductive film, and in registration with the optical fiber array. Means are provided for maintaining such registration.

More particularly, the integrated array is formed by mounting, by means of a frame, light-emitting ends of optical fibers in substantial contact with a thin, optically transparent, electrically conductive ground plane film formed upon a semiconducting film which has been grown upon a substrate.

Small quantities of high-viscosity, light-transparent fluid are applied at the interface between the light-emitting ends of the optical fibers and the conductive surface to fill voids therebetween and optimize light transmission and to provide stress relief when the frame, the optical fibers and the surface of the conductive layer are subsequently epoxy encapsulated.

After removing the substrate, a light sensitive emulsion, applied to the newly exposed surface of the semiconducting film, is activated only in regions registered with the light-emitting ends of the optical fibers by light transmitted directly through the fibers. These activated portions of the emulsion are removed to form openings or windows to expose portions of the semiconductor film below. A metallic film is deposited through the windows onto these exposed portions to form photovoltaic diodes which are in exact registration with the light-emitting ends of the optical fibers. To provide for bonding conductors to the diodes, a thin film of contact metal is applied over the previously deposited metallic film. The remaining emulsion is removed, removing the metalization and contact metal film in locations other than the windows. Wires are bonded to the diodes and the ground plane.

A corresponding method of fabricating the integrated array is thereby provided.

In this manner, an array of optical detecting elements is economically and effectively formed in exact registration with the optical fiber array by utilizing light transmitted directly through the optical fibers, regardless of the configuration of the optical array and without need for fabricating masks for the optical detection arrays.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Known semiconductor and microelectronic processing, except where noted, is generally employed in fabricating an optical detector array associated with a plurality of small diameter optical fibers and for the formation of an integrated interface between the optical fibers and the detectors.

Figure 1:
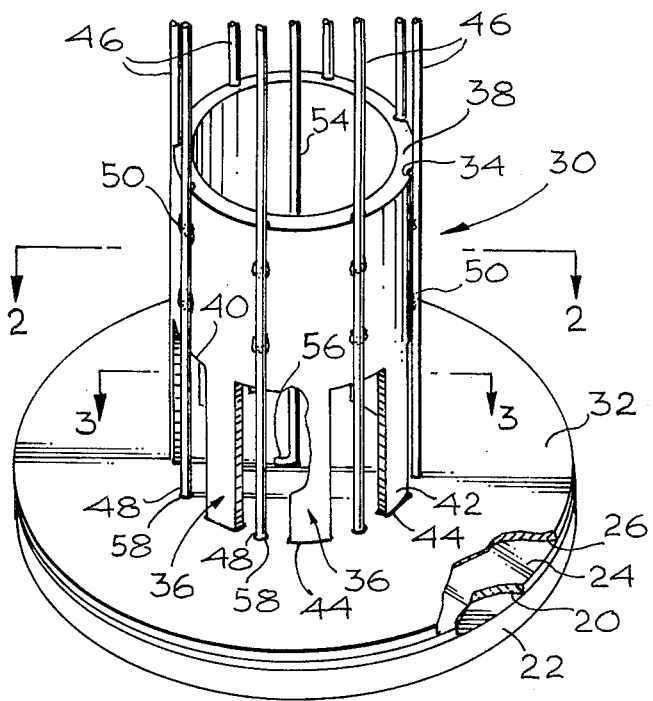
FIG. 1 is a perspective view of one particular arrangement in accordance with the invention, partially broken away to show particular details thereof.

As depicted in FIG. 1, a thin semiconducting film 20, only about one micron in thickness and shown greatly exaggerated in thickness, is grown, epitaxially or pseudo-epitaxially, upon a single crystal substrate 22 using conventional techniques. Preferably, the semiconducting film 20 is cadmium sulfide (CdS), but it may alternatively comprise other Group II–IV compounds such as cadmium selenide (CdSe), cadmium telluride (CdTe), zinc selenide (ZnSe), or zinc telluride (ZnTe). Although silicon is preferred for the substrate, other materials, such as germanium, may be used. The substrate is about one inch in diameter and about 0.010 inches thick.

Upon an exposed upper surface 24 of the semiconducting film 20 is deposited a thin film 26 of an optically-transparent conductive material, such as non-stoichiometric tin dioxide ($SnO_2$), which functions as a ground plane. The film 26 may be formed by oxidizing vacuum deposited tin in air at about 150° C for 30 minutes, or by liquid deposition using a commercial preparation (obtained for example from the Emulsitone Company of New Jersey). The thickness of the conductive film 26 is only about 2000 A. and is also shown much exaggerated in FIG. 1.

Figure 2:
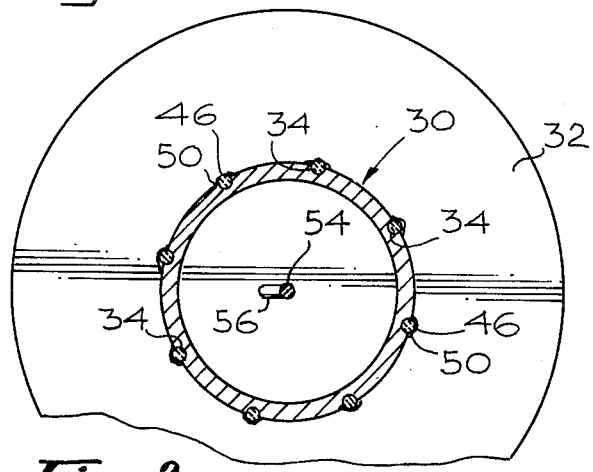
FIG. 2 is a plan view in section, taken along line 2—2 of FIG. 1, showing the optical fibers mounted on the support member.
Figure 3:
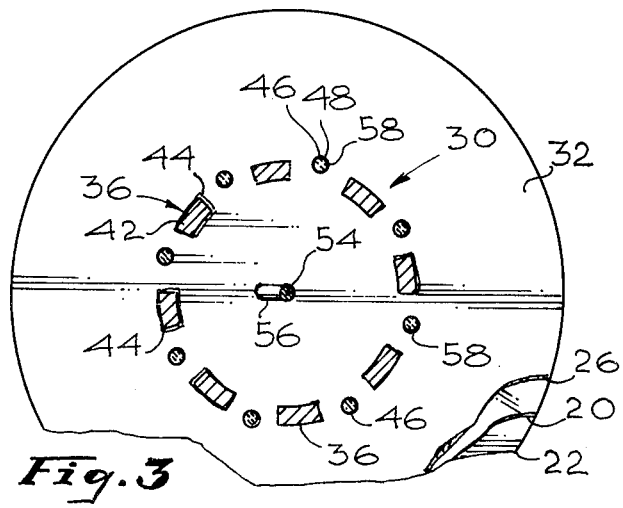
FIG. 3 is another plan view in section, taken along line 3—3 of FIG. 1, showing lower portions of the support member.

Referring now also to FIGS. 2 and 3, a small optical fiber support or mounting frame 30 is attached, as described below, to an exposed upper surface 32 of the conductive film 26. The frame 30 comprises a short section of metal tubing having a plurality of longitudinal optical fiber mounting grooves 34, preferably equally spaced, around the outside of the tube. Cutouts, centered with the grooves 34 and along a lower portion of the frame 30, form a plurality of narrow frame support legs 36 intermediate the grooves. The grooves 34 extend from a top surface 38 of the frame 30 downwardly to a top cutout edge 40. In a typical application, the frame 30 may be about 3/16 inch in diameter, ¼ inch high and have 8 optical fiber mounting grooves 34. The legs 36 may be about 1/32 inch wide and 3/32 inch long or high.

Lower ends 42 of the legs 36 are attached to the surface 32 by small quantities of epoxy cement 44. At least one optical fiber 46, positioned to have a lower light emitting end surface 48 in direct contact with the surface 32, is cemented in each groove 34 with a small quantity of epoxy cement 50. An electrical conductor 52 is directed through the open center of the frame 30 and a lower, bent over end 56 thereof is bonded to the surface 32 for electrical contact therewith. This bonding may be accomplished by use of an electrically-conductive cement or by forming a small gold or aluminum bonding pad (not shown) on surface 32 and thermo-compression or ultrasonically bonding the end 56 thereto.

To enhance optical transmission from the optical fiber light emitting end surfaces 48 into the subjacent material, small quantities of highly viscous, optically-transparent fluid 58, for example, a silicone oil or glycerol, are applied at the emitting end surfaces to penetrate and fill any voids which might exist between the end surfaces and the surface 32. As more particularly described below, the fluid 58 also provides a very important cushioning or stress-relieving function.

Figure 4:
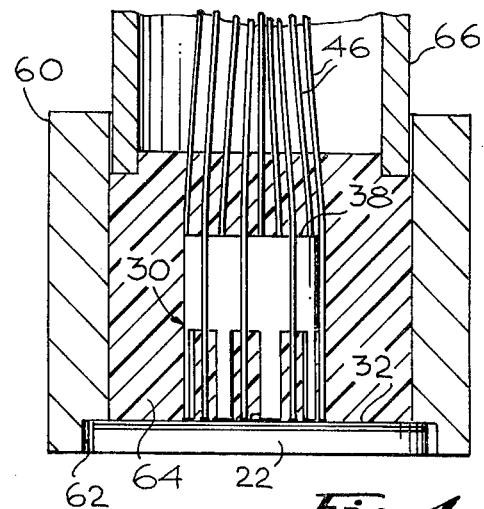
FIG. 4 is a partial sectional view showing epoxy encapsulation of an assembly of the optical fibers, support member and portions of the conductive layer within an encapsulation mold.

After the epoxy cements have fully hardened, preferably at room temperature, the complete assembly — the frame 30, the optical fibers 46 and the composite substrate comprising the substrate 22 and the films 20 and 26 — is placed into a mold 60 which has tubular sides and a cutout portion 62 at the bottom for receiving the composite substrate (FIG. 4). The cavity within the frame 30, as well as regions between the frame and the mold 60 and above the upper surface 38 of the frame, are then filled with an epoxy encapsulating resin 64 (for example, Scotchcast 502 available from the 3M Corporation). Preferably the epoxy resin is vacuum outgassed, using a conventional outgassing procedure, before it is poured into the mold 60. A tubular member 66, which is slidable within the mold 60, is inserted at the top of the epoxy while it is still unhardened so that the encapsulated assembly may be easily removed from the mold by a force exerted on the member 66. Curing of the epoxy 64 may be in a conventional oven at 65° C for five hours.

Figure 5:
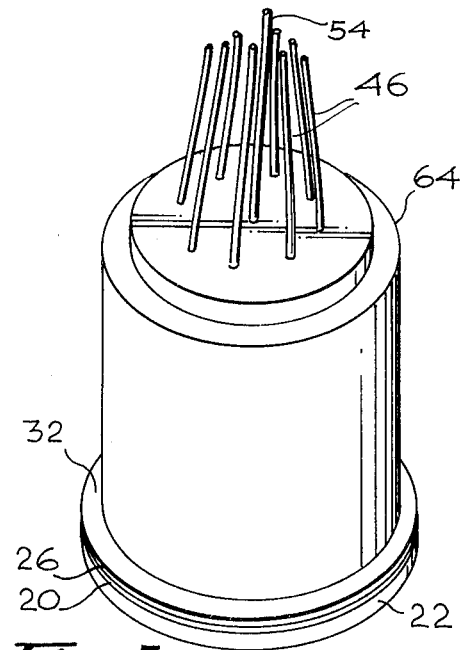
FIG. 5 is a perspective view showing the assembly after encapsulation.
Figure 7:
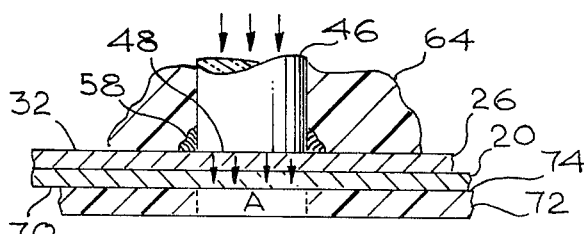
FIG. 7 is a partial vertical sectional view, showing means of activating portions of photoresist directly opposite an optical fiber.

FIG. 5 shows the epoxy encapsulated device removed from the mold 60, all parts of the assembly now being held durably and rigidly in their relative positions by the epoxy 64. As can be seen in FIG. 7, the epoxy 64 does not extend to lower end surfaces 48 of the optical fibers 46 because of the presence of the fluid 58, which thus acts as a cushion protecting the interface between the end surfaces 48 and the surface 32 from stresses caused by the encapsulating process. Also the fluid prevents epoxy from entering between the end surface 48 and the surface 32 where it would reduce light transmission from such end surface.

Figure 6:
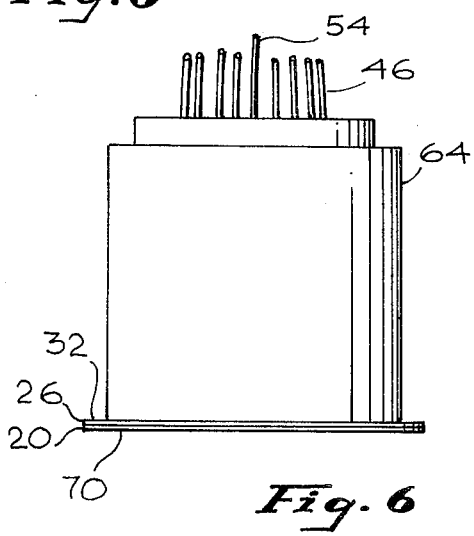
FIG. 6 is an elevational view showing the encapsulated assembly with the substrate removed.

Next, the entire substrate 22 is removed by mechanical separation or cleaving at the interface, or by chemical dissolution (for example, by a solution of potassium ferricyanide) exposing a second, lower surface 70 of the semiconducting film 20 (FIG. 6).

A thin coating 72 of light-sensitive emulsion, or "photoresist", (for example Shipley AZ–1350J, Shipley Co., Inc.) is applied to the second surface 70 (FIG. 7) and allowed to harden, after air drying, at 50° C for 5 minutes. Discrete portions of the photoresist coating 72 are then activated or exposed by transmitting light directly to an inner surface 74 of the photoresist through the optical fibers 46, the conductive film 26 and the semiconducting film 20, thereby exposing only those discrete portions, shown by dashed lines, of the photoresist coating in exact optical registration or alignment with the optical fiber end surfaces 48. It will be appreciated that this will be the situation even if the end surfaces 48 may be inclined relative to the surface 32, and independently of the number and spacings of the optical fibers 46. Further, the necessity for a photoresist exposing mask, or for providing other means for registration, is thereby eliminated, providing a comparatively simple and inexpensive process.

Figure 8:
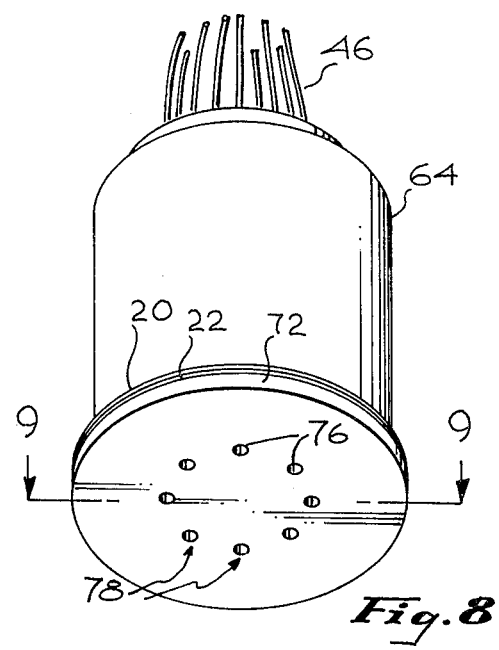
FIG. 8 is a perspective view from the bottom, showing the photoresist layer after removal of activated portions.
Figure 9:
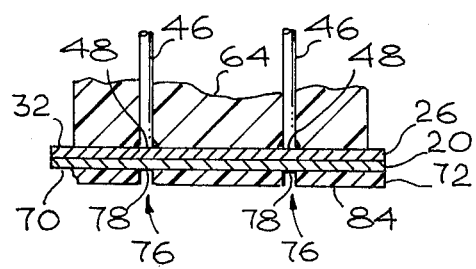
FIG. 9 is a vertical sectional view from line 9—9 of FIG. 8, showing photoresist windows directly opposite optical fibers.

After activation of the portions of photoresist in the above described manner the coating 72 is "developed", enabling the activated regions then to be chemically removed according to well known processes. Since unexposed portions of the coating 72 are not removed, a plurality of openings or windows 76 are formed in the coating, thereby exposing portions 78 of the lower semiconducting film surface 70 (FIGS. 8 and 9). It is emphasized that the windows 76 and the surface portions 78 of the semiconducting film 20 are in exact optical registration with the optical fiber end surfaces 48, because the windows were formed as a direct result of exposing the photoresist by light transmitted through such end surfaces.

Figure 10:
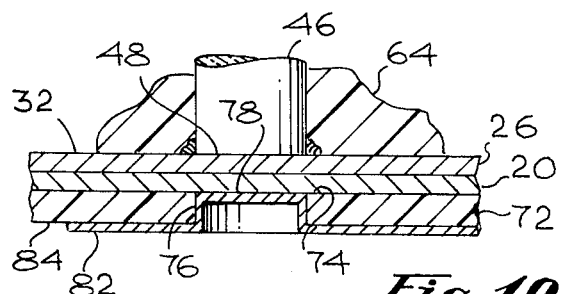
FIG. 10 is a partial vertical sectional view showing deposition of platinum through the photoresist windows.

Subsequent to formation of the photoresist windows 76, a thin metal film 82, preferably about 100 A. of platinum or other metal having a work function greater than that of the semiconductor film 20, is vacuum deposited across the entire lower surface 84 of the photoresist coating 72 and through the windows 76 to form a coating on the exposed portions 78 of the semiconducting film, thereby forming a comparatively abrupt alloy-type junction or interface between the metal and the semiconductor material (FIG. 10). In this manner, photovoltaic diode, optical detecting elements are formed. Some deviation from standard metalization processes is required to prevent outgassing of the encapsulating epoxy: the platinum is deposited at about room temperature, rather than an elevated temperature, within a vacuum deposition chamber, from a small resistance-heated tungsten source. A short metal deposition time, about 5 minutes, is necessary to prevent substantial heating of the assembly, and the epoxied assembly is preferably heat sinked. Further, the area of the hot area surface of the deposition source is limited to only about 0.2 $Cm^2$, and a source-to-substrate distance of at least 25 cm is maintained.

Figure 11:
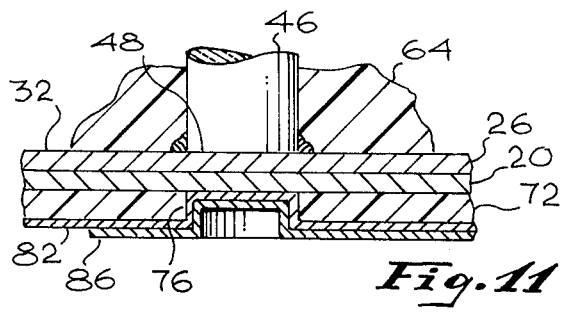
FIG. 11 is a partial vertical sectional view showing deposition of the contact metal through the photoresist windows.

Next, as seen in FIG. 11, upon the film 82 a thin film 86 of electrical contact material, for example, about 4000 A. of aluminum, is also vacuum deposited in a manner similar to that described above. The remaining portion of the photoresist layer 72 is then chemically removed using an appropriate commercial stripper, thereby removing all portions of the films 82 and 86 except those portions immediately above the semiconducting surface portions 78. That is, all portions, of the films 82 and 86 other than in locations of the windows 76, are removed.

Figure 12:
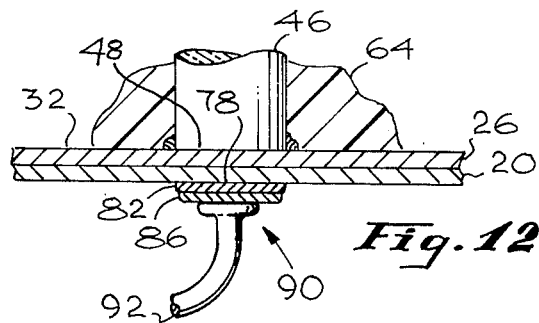
FIG. 12 is a partial vertical sectional view showing the photoresist removed and a conductor bonded by thermal compression to the metal contact area.

An array of discrete optical detector elements 90, or photovoltaic diodes, are in this manner formed upon a common film 20 of semiconducting material, each element 90 being formed in exact optical registration with a light emitting end surface 48 of an optical fiber 46 (FIG. 12).

A conductor 92, for example a 5 mil gold wire, is bonded by conventional thermal compression or ultrasonic bonding techniques to each optical detector element 90. The conductor 54, connected to the conductive film (or ground plane) 26 forms a common second electrical connection for each element 90.

Figure 13:
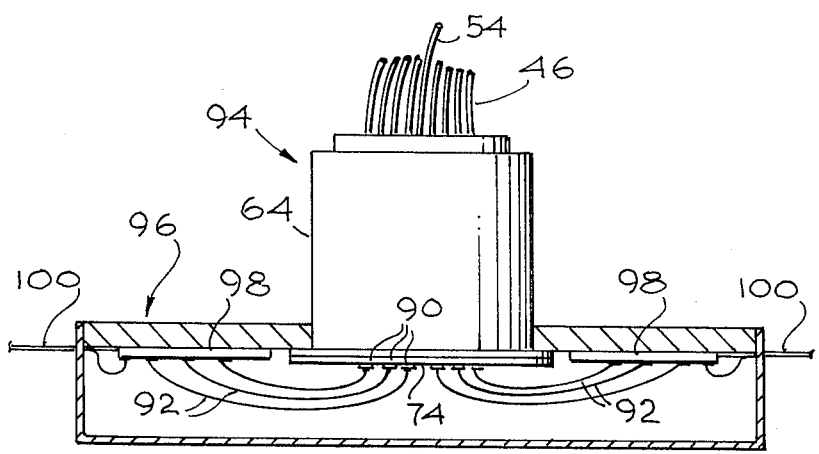
FIG. 13 is a vertical sectional view showing the optoelectronic assembly mounted with other circuit elements in a package.

FIG. 13 illustrates a typical mounting of a completed assembly 94, comprising, for example, an array of eight optical fibers 46 and eight optical detectors 90 registered therewith, in a hermetically sealed package 96. Also mounted in the package 96 are integrated circuit chips 98 which may be preamplifiers, to which the conductors 92 are bonded for interconnection. A completely integrated optoelectronic system or subsystem is thereby provided, light entering the package 96 through the optical fibers 46 and electrical outputs from the package being through package leads 100 and the conductor 54.

Figure 14:
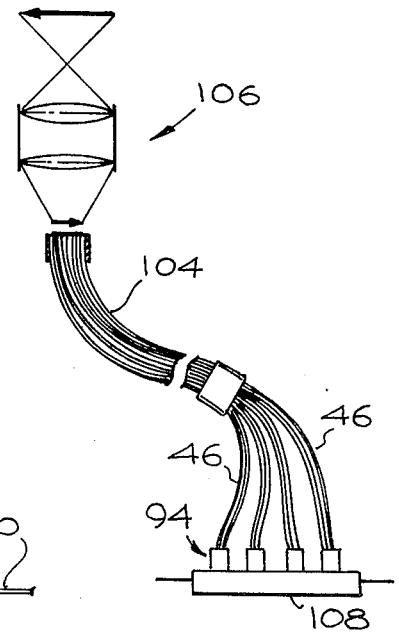
FIG. 14 is a diagram showing a typical optoelectronic system utilizing the described optical detectors and interface structures.

A typical application illustrated in FIG. 14 comprises a system utilizing a bundle 104 of optical fibers 46 terminating at a first end adjacent the focal plane of an optical system 106 from which light is received by the individual fibers. The bundle 104 is routed to a convenient location at which the fibers 46 are separated into a plurality of integrated optical detector assemblies 94 which may be mounted in a common package 108. Outputs for the package 108 are fed into various other electronic units such as amplifiers (not shown).

Although there has been described and illustrated a frame 30 adapted for receiving eight optical fibers, it is to be appreciated that similar frames, not necessarily circular in cross section and mounting a greater or lesser number of optical fibers, may be employed. Nor is the scope of the invention limited to the use of very small diameter optical fibers, it being equally applicable to larger diameter fibers. Further, it is unnecessary that end surfaces at the optical fibers be positioned adjacent the surface 32; it is only necessary that light emitting portions, which may also be side portions, be so positioned.

Although there have been described above specific arrangements of an integrated array of optical fibers and thin film optical detectors, and method for fabricating the same, in accordance with the invention, for the purpose of illustrating the manner in which the invention may be used to advantage, it will be appreciated that the invention is not limited thereto. Accordingly any and all modifications, variations or equivalent arrangements which may occur to those skilled in the art should be considered to be within the scope of the invention as defined in the appended claims.

What is claimed is:

1. An integrated array of optical fibers and thin film optical detectors, which comprises:
    a. thin film optical detector means,
        said detector means including an optically transparent, electrically-conductive film and a spaced array of thin film optical detector elements formed along a first surface thereof; and
    b. an array of optical fibers, said array comprising a pluality of optical fibers having light emitting first portions thereof in substantial contact with a second surface of said conductive film and in registration with said detector elements, the precise location of each individual detector element on said first surface being predetermined by transmitting light through said optical fibers to establish detector regions whereby each optical fiber is in optical communication with a corresponding one of said detector elements,
        said optical fibers having second portions adapted for receiving light from a light source.

2. The invention as claimed in claim 1, including means for optimizing light transmission from said light emitting first portions to said detector elements.

3. The invention as claimed in claim 2 wherein said optimizing means includes an optically-transparent fluid for filling voids between said light emitting first portions and adjacent portions of said second surface of said conductive film.

4. The invention as claimed in claim 3 further including a shaped, hardened, epoxy encapsulating resin encapsulating the electrically-conducting film, the optically-transparent fluid, and the first portions of the optical fibers.

5. The invention as claimed in claim 3 wherein the optically-transparent fluid comprises a silicone oil.

6. The invention as claimed in claim 1, including means for providing electrical contact with said detector elements, said means including conductors attached to exposed surfaces of said detector elements and at least one common conductor attached to said conductive film.

7. The invention as claimed in claim 1 wherein said detector elements are formed of a semiconductor film having deposited thereupon a metallic film to cause said semiconductor film to be photovoltaic.

8. The invention as claimed in claim 7 wherein each detector element comprises a photovoltaic diode including an isolated segment of said metallic film forming an alloy-type junction with an adjacent portion of the semiconductor film.

9. The invention as claimed in claim 1 further including mounting means encapsulating portions of said optical fibers and portions of said conductive film in a hardenable resin compound.

10. The invention as claimed in claim 9 wherein said mounting means further includes a tubular mounting element having exterior, axial optical fiber receiving grooves and means for retaining said optical fibers in said grooves.

11. The invention as claimed in claim 1 further including a stress relieving medium adjacent the light emitting first portions of the optical fibers and the second surface of the conductive film.

12. The invention as claimed in claim 11 wherein said medium comprises an optically-transparent fluid filling voids between said light emitting first portions and adjacent portions of the second surface of the conductive film.

13. The invention as claimed in claim 11 wherein the stress relieving medium comprises a silicone oil.

14. The invention as claimed in claim 1 wherein the precise location of each individual detector element is determined by light transmitted from a corresponding optical fiber.

15. The invention as claimed in claim 1 wherein each individual detector element is in exact registration with the light path from a corresponding optical fiber.

16. The invention as claimed in claim 1 wherein each individual detector element comprises a segment of an extended semiconductor film adjacent the electrically-conductive film, and an isolated metal film having a work function greater than that of the semiconductor film deposited along a surface of the semiconductor film remote from the electrically-conductive film exactly corresponding to the portion thereof exposed to light transmitted by the particular optical fiber corresponding to said detector element.

17. The invention as claimed in claim 16 wherein the metal film comprises platinum.

18. The invention as claimed in claim 16 wherein each individual detector element further comprises an isolated film of electrical contact material deposited along a surface of the metal film remote from the semiconductor film.

19. The invention as claimed in claim 18 wherein the contact material comprises aluminum.

20. The invention as claimed in claim 18 wherein each individual detector element further comprises an individual conductor attached to said electrical contact material, the array further including at least one common conductor attached to the electrically-conductive film at the second surface, and means for establishing electrical connections to said individual and common conductors.

21. The invention as claimed in claim 16 wherein said semiconducting film comprises a compound selected from Groups II–IV.

22. The invention as claimed in claim 21 wherein the semiconducting film comprises cadmium sulfide, wherein the electrically-conductive film comprises non-stoichiometric tin dioxide, wherein the metal film comprises platinum deposited on the cadmium sulfide remote from the tin dioxide and further including a film of aluminum deposited on the platinum remote from the cadmium sulfide.

23. The invention as claimed in claim 22 wherein the cadmium sulfide film is about 0.01 inch thick, wherein the tin dioxide film is about 2000 A. thick, wherein the platinum film is about 100 A. thick and wherein the aluminum film is about 4000 A. thick.

\* \* \* \* \*